United States Patent
Soderholm et al.

(10) Patent No.: US 12,451,963 B2
(45) Date of Patent: Oct. 21, 2025

(54) COMMUNICATION USING LIGHT EMISSION AND CAMERA

(71) Applicant: SIGNIFY HOLDING B.V., Eindhoven (NL)

(72) Inventors: Brian J. Soderholm, Peachtree City, GA (US); Joseph Kyle Van Bavel, Oakville, CA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 286 days.

(21) Appl. No.: 18/271,490

(22) PCT Filed: Jan. 13, 2022

(86) PCT No.: PCT/EP2022/050674
§ 371 (c)(1),
(2) Date: Jul. 10, 2023

(87) PCT Pub. No.: WO2022/152808
PCT Pub. Date: Jul. 21, 2022

(65) Prior Publication Data
US 2024/0072894 A1    Feb. 29, 2024

Related U.S. Application Data

(60) Provisional application No. 63/138,553, filed on Jan. 18, 2021.

(30) Foreign Application Priority Data

Feb. 23, 2021    (EP) ..................................... 21158735

(51) Int. Cl.
*H04B 10/116*    (2013.01)
*G06V 10/141*    (2022.01)
*G06V 10/25*    (2022.01)

(52) U.S. Cl.
CPC ......... *H04B 10/116* (2013.01); *G06V 10/141* (2022.01); *G06V 10/25* (2022.01); *G06V 2201/06* (2022.01)

(58) Field of Classification Search
CPC ..................... H04B 10/114–116; G06V 10/25
See application file for complete search history.

(56) References Cited

U.S. PATENT DOCUMENTS

2006/0133648 A1*    6/2006    Meunier ............ H04B 10/1149
                                                         382/152
2017/0206417 A1    7/2017    Aoyama et al.
(Continued)

FOREIGN PATENT DOCUMENTS

EP    1439649 A1    7/2004
WO    2017140220 A1    8/2017

OTHER PUBLICATIONS

Lee, Dan, et al., "Tracking Objects: Acquiring and Analyzing Image Sequences in Matlab," Mathworks, Technical Articles and Newsletters, https://www.mathworks.com/company/newsletters/articles/tracking-objects-acquiring-and-analyzing-image-sequences-in-matlab.html, Last Visited on Jun. 30, 2023 (9 Pages).

(Continued)

*Primary Examiner* — Nathan M Cors

(57) ABSTRACT

In accordance with example systems and methods, an equipment can be operable to emit, using a light emitting device (e.g., an LED), coded light. The coded light can be captured by a camera in the form of image data. The image data can be processed and to data related to the equipment, such as a hardware information, version of software associated with the equipment, status, settings, and other equipment data.

15 Claims, 10 Drawing Sheets

(56) References Cited

U.S. PATENT DOCUMENTS

2018/0314866 A1   11/2018  Kotula
2018/0359031 A1*  12/2018  Raynor .................... G06T 7/70
2019/0280770 A1*  9/2019  Hicks ................... H04B 10/116
2019/0295290 A1*  9/2019  Schena ............. G06Q 10/0832
2023/0074046 A1*  3/2023  Nilsson ................. G06V 10/25

OTHER PUBLICATIONS

"Inspect.Assembly Automated Visual Inspection Station, Radiant Vision Systems," https://www.radiantvisionsystems.com/products/advanced-vision/inspectassembly-automated-visual-inspection-station, Last Visited on Jun. 30, 2023 (7 Pages).

* cited by examiner

COMMUNICATION USING LIGHT EMISSION AND CAMERA

CROSS-REFERENCE TO PRIOR APPLICATIONS

This application is the U.S. National Phase application under 35 U.S.C. § 371 of International Application No. PCT/EP2022/050674, filed on Jan. 13, 2022, which claims the benefit of U.S. Provisional Patent Application No. 63/138,553, filed on Jan. 18, 2021 and European Patent Application No. 21158735.7, filed on Feb. 23, 2021. These applications are hereby incorporated by reference herein.

TECHNICAL FIELD

The present application relates generally to the field of data processing, and more specifically to systems and methods relating to a device comprising a camera that detects coded light emitted from an equipment comprising a light indicator, the coded light comprising identifying information.

BACKGROUND

In assembly plants, it can often be difficult to determine which version of software (e.g., firmware) is installed in which equipment, including in incidences where equipment is repurposed. For example, an equipment might bear a model number affixed to the equipment, but the version of software installed in the device might not be apparent without running a diagnostic. Especially in a setting in which multiple plants assemble a large mix of equipment, some equipment look identical to other models and only vary in firmware, or only vary in configuration settings. Ten different versions of the same equipment that might look physically identical to each other to the eye might each have different versions of software. Sometimes devices are re-programmed, and it is often difficult to determine what version of software the devices now run. Some equipment do not have a screen, so they cannot display the version of software to a person viewing the equipment. While a diagnostic can be used to determine the software version, such as connecting the equipment via an interface to a computer, and the process might be time consuming, and can involve taking a device off of an assembly or distribution line, and can take technician time to diagnose. Moreover, even after diagnosis, a particular equipment might not have any physical space to place a new label indicating its software version. When it is shipped into service, the installer might also struggle with knowing whether the device has the correct or most updated version of software. Without the ability to perform a more efficient detection of software version, it is easy to have the wrong sensor installed and make it through inspection and ship to a customer. This results in expensive tasks to resolve in the field.

During installation or service (e.g., at a customer premise), in which devices are installed or replaced, the visual similarity in models can also cause confusion. Sometimes equipment is re-purposed (or re-circulated, or refurbished), and the software in the equipment might not be updated (or in some cases, might require a lower firmware version). Once equipment is installed, it might be a difficult task to replace it, in the event that the software version is an incorrect, or non-optimal version. Thus, before installation, identification of the software version of the equipment might be preferable.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
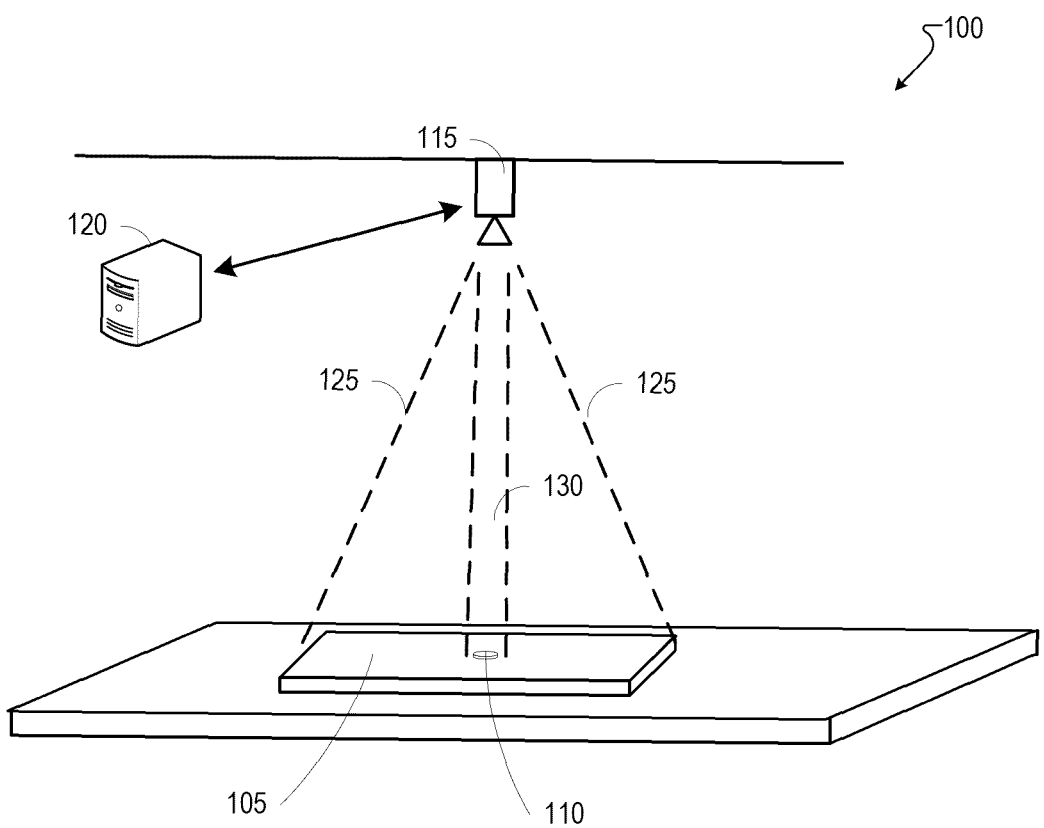
FIG. 1 is a diagram illustrating an example communication system using light emission and a camera, in accordance with various aspects and embodiments of the subject disclosure.

The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide an understanding of the subject disclosure. It may be evident, however, that the subject disclosure can be practiced without these specific details. In other instances, well-known structures and devices are shown in block diagram form in order to facilitate describing the subject disclosure.

The subject disclosure of the present application describes example embodiments of systems (referred to herein as the "camera and light emission-based communication system,"

or for convenience "example systems," or "systems") and methods, described below with reference to block diagrams and flowchart illustrations of methods, functions, apparatuses, and computer program products and modules. Steps of block diagrams and flowchart illustrations support combinations of mechanisms for performing the specified functions, combinations of steps for performing the specified functions, and program instructions for performing the specified functions. It should be understood that each step of the block diagrams and flowchart illustrations, combinations of steps in the block diagrams and flowchart illustrations, or any operations, functions, methods, and processes described herein, can be implemented, in accordance with example embodiments of the present invention, by computer processing systems comprising devices (e.g., camera, equipment, computer, mobile device, etc.), having one or more microprocessors and one or more memories that store executable instructions (e.g., computer program product, computer-readable instructions, software, software programs, software applications, etc.) that, when executed by the one or more microprocessors, facilitate (e.g., perform, control, command, direct, order, transmit signals enabling, etc.) performance of the operations, functions, methods, and processes described below in accordance with example embodiments of the present invention. The one or more microprocessors (e.g., processors, central processing unit (CPU), system on a chip (SoC), application specific integrated circuit (ASIC), combinations of these, or other programmable data processing apparatus) can be any microprocessor device known to those of ordinary skill, for example microprocessors offered for sale by Intel (e.g., branded Pentium microprocessors), Advanced Micro Devices (AMD), International Business Machines (IBM) and the like. It is also contemplated that microprocessors of other brands can be suitable. Additionally, future microprocessors, as they are developed and branded, are contemplated to be within the scope of the present invention. The term microprocessor is further elaborated upon below. The memories can comprise any suitable computer-readable storage medium, including, for example, on-chip memory, read only memory (ROM), random access memory (RAM), hard disks, compact disks, DVDs, optical data stores, and/or magnetic data stores. In addition to microprocessors and memories, the one or more devices can also comprise circuitry and hardware components as described below with respect to FIG. 10.

The present application relates to systems and methods for communicating using emissions of visible light, a camera for capturing images of the LED emitted visible light that is at a frequency, and processing of the captured data representative of the images. The coded light can be indicative of various data related to the equipment (e.g., equipment data).

FIG. 1 is a diagram illustrating an example of an environment 100 depicting various devices that can be used in the example embodiments of the light.

In example embodiments in accordance with the present application, an equipment 105, which can be any kind of equipment (e.g., luminaire, meter, router, set-top box, modem, refrigerator, etc.), can comprise one or more light emitting devices (e.g., light emitting diodes (LEDs)), referred to in the singular as light emitting device 110. A microprocessor inside the equipment 105, executing software, can facilitate emission of coded light by the light emitting device 110. The microprocessor can, for example, translate data associated with the equipment (e.g., equipment data) into a coded signal, directing the light emitting device 110 to emit flashes of light containing the equipment data in the form of coded light. These light emissions, beginning with a first stage of emissions, can occur upon power-on of the device, or in response to a trigger. The trigger can be, for example, a coded infrared beam transmitted to and detected by an infrared sensor on the equipment. The trigger can be, for example, coded light transmitted to and detected by a light sensor on the equipment. The trigger can be, for example, an audible coded sound.

A camera 115 can comprise a microprocessor and a memory that stores executable instructions that, when executed by the microprocessor, facilitate performance of operations, such as the capture of images, which can be of emitted coded light from the equipment 105. The camera 115 can transmit captured images as data sets to a computer, e.g., computer 120, via a wired or wireless connection. The data set can be individual frames that were captured, or can be a file, such as, for example, a video file (e.g., MPEG file, MP4 file, AVI file, the like).

FIG. 1 also shows a data processing device, which can be a computer 120, comprising a microprocessor and a memory that stores executable instructions that, when executed by the microprocessor, facilitate performance of operations, including processing and interpreting the captured images (e.g., decode the flashes of light captured by the images).

In example embodiments, the equipment 105 can, in a first stage, emit visible light, via its light emitting device 110. The camera 115 can capture a field of view (first field of view 125, designated by the dotted lines) in which a surface area of the equipment (which can comprise the entire surface area of one face of the equipment, or a large portion of the surface of the equipment) can be captured. The emission of light during the first phase can be of a first frequency, which can be captured by a camera operating at a first sampling rate, e.g., sampling at 30 frames per second (FPS). The camera data representative of the images of a substantial portion (or a large portion) of the surface of the equipment 105 can be analyzed by the computer 120 (or, alternatively by the camera 115). The computer 120 (or alternatively the camera 115), processing this first set of images captured by the camera at the frames per second rate, can determine the location of the light emitting device 110 on the surface of the equipment 105 (e.g., within the full image that includes the entirely of the surface, or a large portion, of the equipment, for example). This processing and determination can entail, for example, continuously comparing consecutive images and subtracting them to get absolute difference. The computer 120 can determine the location of the light emitting device 110, and can determine a region of interest (ROI), which is a smaller area of the surface area, in which the light emitting device is located.

With the region of interest identified, the equipment 105, after a few moments (e.g., 5 seconds) of emitting light via the light emitting device 110 in the first stage at a slower frequency, can operate in a second phase in which it emits light at a higher frequency. This smaller region of interest can allow for achievement of a higher frames per second (FPS) max. For example, a 70 FPS can be achieved for 1.5 megapixel (MP) for the region covered by the entire field of view 125, but a max of 4000 FPS can be achieved for the 120-pixel region of interest. Thus, for example, when capturing images in the second phase, the camera 115 can capture images at, for example, 2400 FPS to support a 300 baud data rate. In some example embodiments, the camera can be operable to sample the region of interest, discarding or throwing away data that is not in the region of interest (e.g., only obtain and process pixels from where the region of interest is). As such, even though the physical optics of the camera cover a larger surface area of the equipment, the camera can be programmed to only process the image in the region of interest, which contains the flashing light emitting device. In this digital solution, the camera captures the larger region of the surface of the equipment, and but transmits to the computer 120 only the data related to the region of interest.

In other example embodiments, the camera 115 can be operable to mechanically focus on the region of interest (e.g., by way of receipt of commands from the computer 120, or if the camera 115 is programmed to do so, instructed by itself). The camera 115 can mechanically narrow its field of view 125 to the narrower field of view 130 so as to focus on the region of interest containing the light emitting device. The camera 115 after mechanically adjusting its focus, captures the light emissions from the targeted, smaller, 120-pixel region of interest, which it can now sample at a higher frequency.

In other embodiments, the region of interest can be specified to the camera 115. The camera can be directed to a region of interest based upon coordinates of where the region of interest is. In these example embodiments, a region of interest of a particular equipment is located in the same location (e.g., location on an x-y basis) on each of the particular equipment. In these embodiments, a two-stage emission solution might not be needed (although the equipment can still be programmed to engage in two stages of emissions), as the first state of flashing that serves to identify the region of interest can be obviated since the coordinates are already known. The location information can be stored in a database accessible by the computer 120, and the database can contain the location information for each particular user equipment. The computer can use this information to look up the x-y coordinates of the region of interest for the particular equipment. In these embodiments, the identity of the model can first be input into the computer 120 (e.g., keyed in by hand, read by bar code, etc.) so that the computer can obtain the coordinate information corresponding to that particular equipment's model.

After the region of interest has been identified by coordinates, then, as with before, the computer 120 can in some embodiments be operable to direct the camera 115 to capture the first field of view (e.g., first field of view 125) and process only the data related to the region of interest containing the light emitting device 110, or in other example embodiments, employ the mechanical solution of changing the focus from a larger field of view to a smaller field of view (e.g., narrower field of view 130).

The light emitting device 110 flashes can serve as coded light. The on-off of the lights, captured by the camera (camera 115, camera 310), can serve to operate as binary coding, or can also be used to signal in morse code, Universal Asynchronous Receiver/Transmitter (UART), or some other code (see, e.g., FIG. 2, captured image data 205 after processing is transferred to a standard format). As another example, the coded light can be transmitted data that makes up an image of a barcode, and then this barcode could be interpreted by a computing device (e.g., computer 120) to extract information from it. In the example embodiments, the coded light emitted by the equipment can contain a variety of equipment data related to the equipment 105, and this information can be processed by a computing device (e.g., computer 120, or by camera 115 if it has a microprocessor and memory programmed to do so) to obtain the decoded equipment data. The equipment data can comprise any information related to the equipment 105 that might be of interest. The equipment data can be, for example, be a version of software installed in the equipment 105 (e.g., software version). The equipment data can also comprise, for example, hardware information (e.g., information regarding hardware components in the equipment), such as manufacturing date. The equipment data can also comprise diagnostic information (e.g., elapsed run time, faults, warnings, etc.). The equipment data can comprise a status of the equipment. The status can indicate that a component of the equipment (e.g., the transceiver, the Wi-Fi receiver, a memory chip, a port, etc.) is not functioning properly. The status can indicate a setting of the equipment (e.g., configuration settings). Often times, a user has changed a setting of an equipment, making it operate in a manner unexpected by the user. For example, a user might have accidentally changed a setting for a device to shut down after 600 minutes instead of 60. Other equipment data that can be contained in the coded light can be, for example, measurements taken by the equipment, color of components, temperature measurements, brightness measurements, and dimensions of the equipment, for example. The equipment data can comprise any information that may be of interest.

In example embodiments, when an equipment (e.g., equipment 105) is updated with new software (e.g., firmware), it can be operable to flash coded light that reflects that update. As such, once the equipment and installed with updated software, not only has the operation of the device been changed, but the newly installed software can control the output of coded light to contain information regarding the version of the new software, for example.

In other example embodiments, the light emitting devices (e.g., LEDs) of the user equipment can be of different color. The differently colored light emissions can allow for the transmission of coded light that contains more information, since each different color can represent another tier of information.

After the images containing the coded light emissions are processed, the microprocessor of the computer 120 can be operable to facilitate output of information related to the equipment data, for example, by transmitting the information related to the equipment data to a screen, transmitting the information via an email or text message, or the like. Any suitable reporting or alerting function can be used to provide the information.

Figure 3:
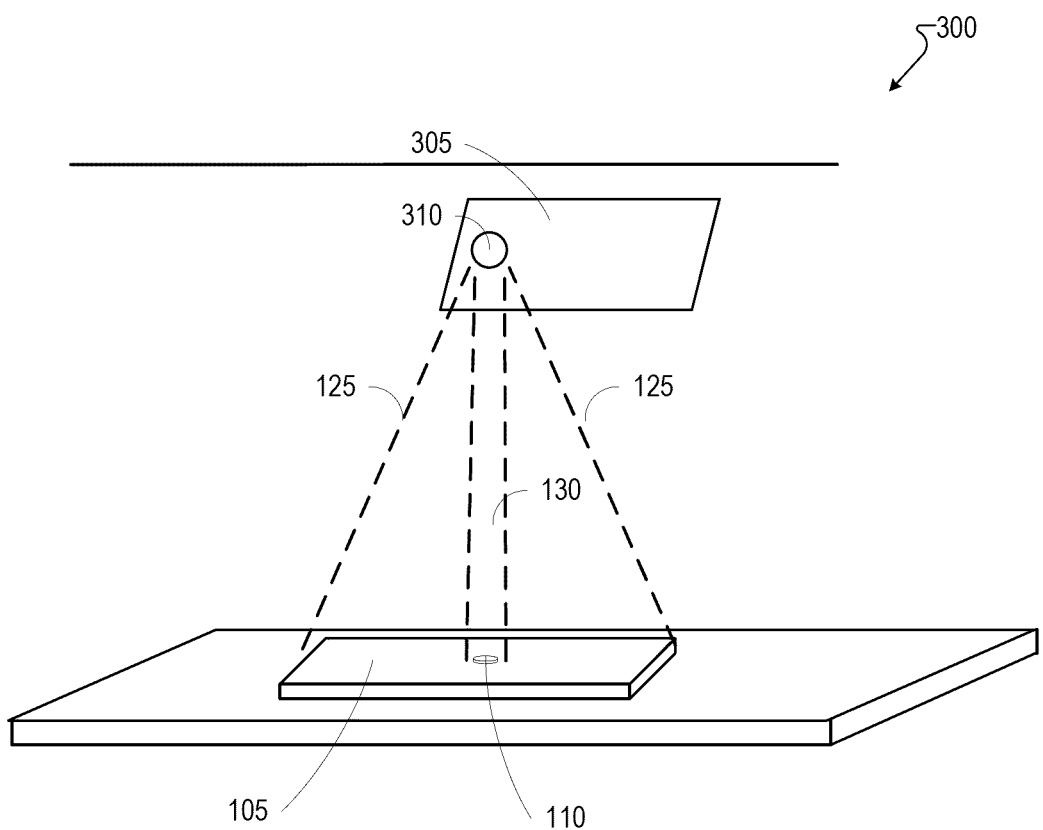
FIG. 3 is a diagram illustrating an example communication system using light emission and mobile device comprising a camera, in accordance with various aspects and embodiments of the subject disclosure.

FIG. 3 shows a diagram illustrating an example of an environment 300, in accordance with example embodiments of the present application, in which the camera 115 and computer 120 are integrated together as a mobile device 305. The mobile device 305 can be a smartphone having a camera. The mobile device 305 can have a microprocessor and memory, a memory that stores executable instructions that, when executed by the microprocessor, facilitate performance of operations as described above with respect to FIG. 1's camera 115 and computer 120. For example, the mobile device 305 can trigger the equipment 105 to initiate emissions of coded light, and the mobile device 305 can, using its camera, mobile device camera 310, capture images of the emitted light from the equipment 105. The mobile device 305, using its microprocessor, can also be operable to process the images to extract the information contained in the emitted coded light.

In the example embodiments described, using the light emitting device (e.g., LEDs) to communicate using flashes (or pulses) of light allow for an easier way to obtain information from a device. In particular, this technique would allow transfer of information without the use of various interfaces, whether ethernet, Bluetooth, Wi-Fi, or other communication interfaces, which might be absent from the equipment.

In accordance with example embodiments, one or more of the example processes, methods, or operations, as described above, can be performed as described in FIGS. 4-6. The methods and operations can be performed by one or more devices comprising a microprocessor and a memory. Machine-readable storage media, comprising executable instructions that, when executed by a microprocessor, can also facilitate performance of the methods and operations described in FIGS. 4-6. In each of these operations, steps or aspects described in one operation can be substituted or combined with steps and aspects with respect to the other operations, as well as features described, unless context warrants that such combinations or substitutions are not possible. Further, if a feature, step, or aspect is not described with respect to example operations, this does not mean that said feature, step, or aspect is incompatible or impossible with respect to those operations. As such, the example processes, operations and methods of the present application described above (e.g., with respect to FIGS. 1-3) and below are not necessarily limited to the steps, features, or aspects that are described with respect to those example operations. Further, steps, features, or aspects are not limited to those described in FIGS. 4-6, and can be combined or substituted with other steps, features or aspects in accordance with example implementations as described in this disclosure above and below.

Figure 4:
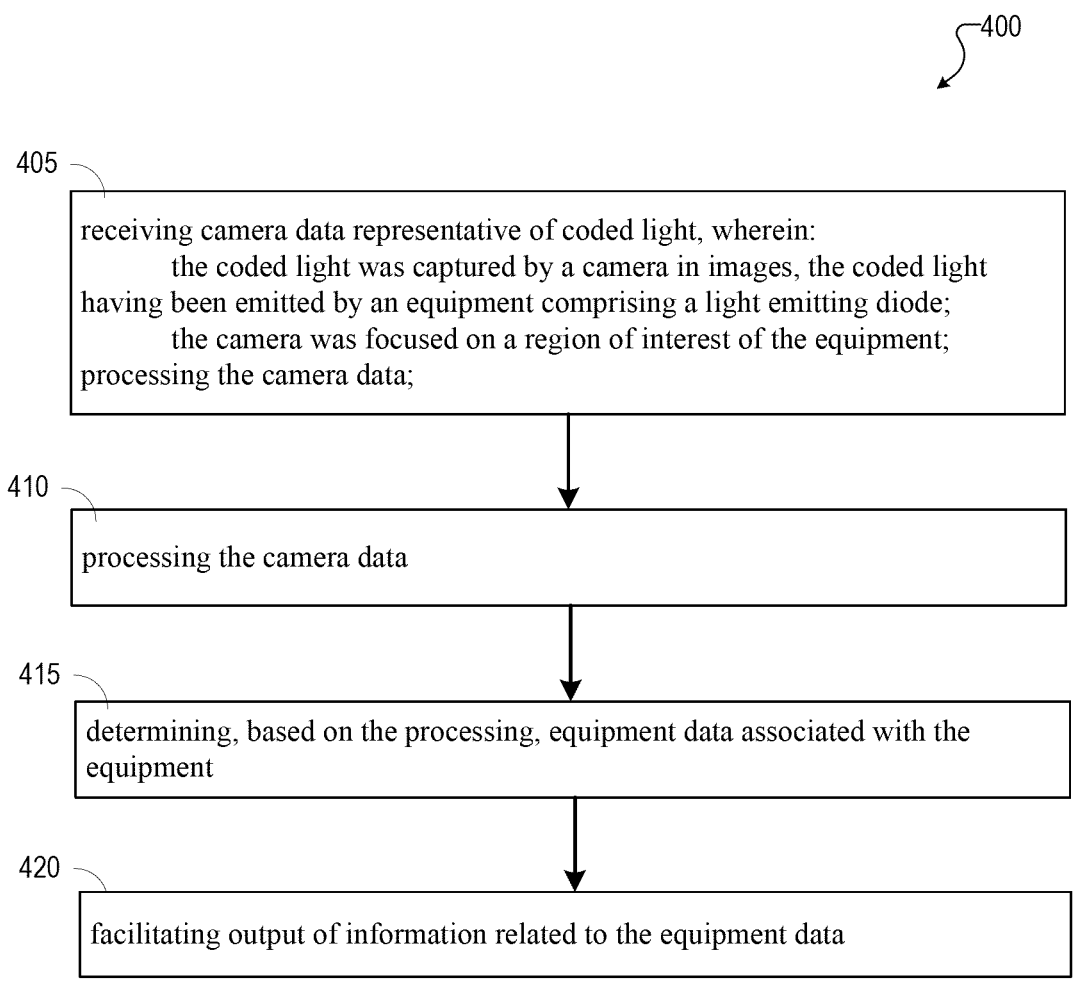
FIG. 4 illustrates a flow diagram relating to example operations that can be performed by a data processing device, in accordance with various aspects and embodiments of the subject disclosure.

Referring to FIG. 4, a data processing device (e.g., computer 120, mobile device 310) can comprise a microprocessor (examples of which device were described above) and a memory that stores executable instructions that, when executed by the microprocessor, facilitate performance of operations (e.g., methods).

The operations 400 can comprise, at block 405, receiving camera data representative of coded light emitted by an equipment (e.g., equipment 105). The coded light is captured by a camera (camera 115, mobile device camera 310) in images. The coded light can be emitted by a light emitting device (e.g., light emitting device 110, which can be a light emitting diode (LED, one or more LEDs)). The camera was focused on a region of interest of the equipment. The region of interest can be determined based upon coordinates indicating a location of the region of interest. The region of interest can in other embodiments, be located after determining the location of the region of interest based on receiving and analyzing image data representative of flashing light emitted at a lower frequency than the coded light.

At block 410, the operations 400 can comprise processing the camera data.

At block 415, the operations 400 can comprise, determining, based on the processing in block 410, equipment data associated with the equipment, examples of which were described above.

The operations 400 can, at block 420, comprise facilitating output of information related to the equipment data.

Figure 5:
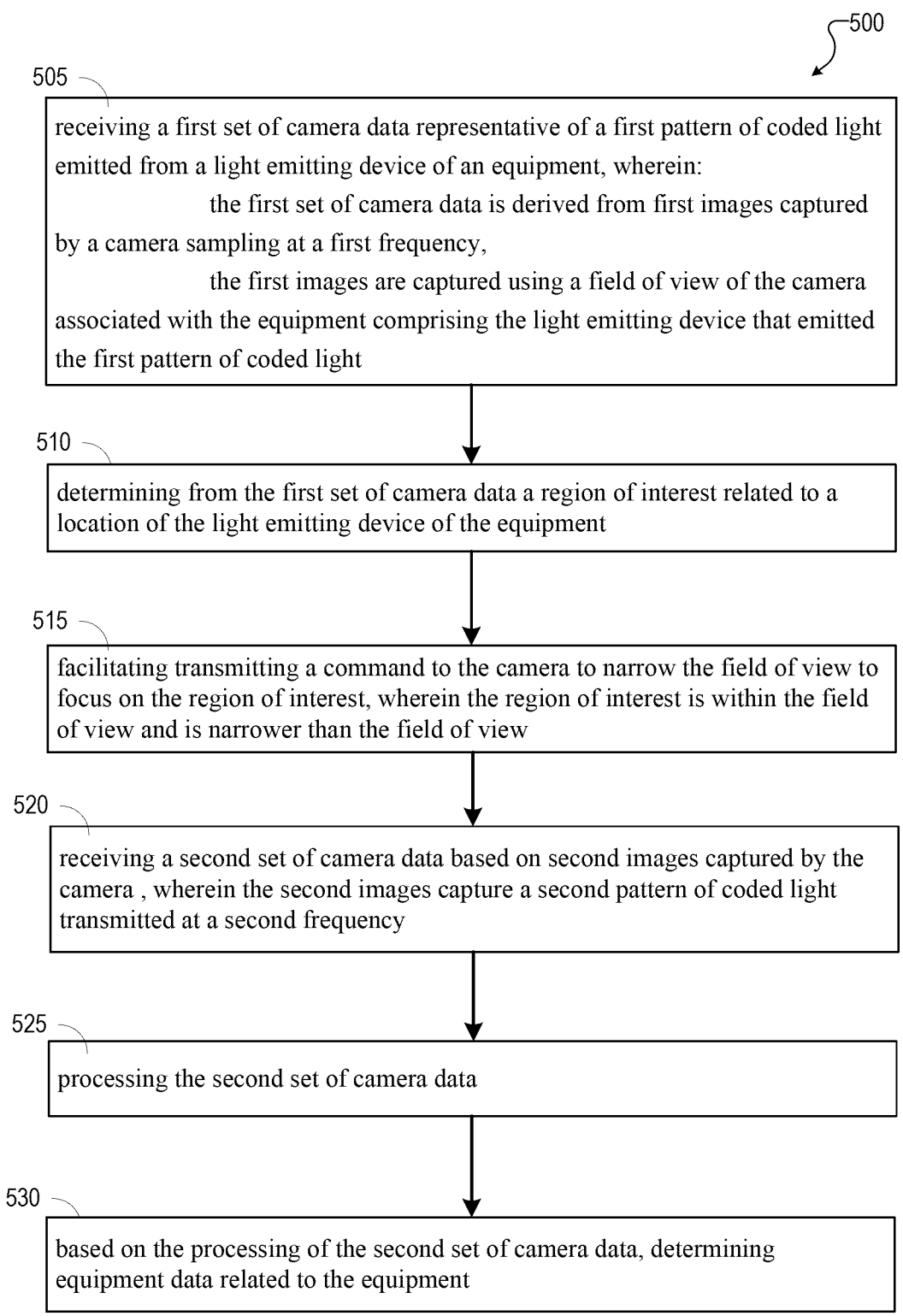
FIG. 5 illustrates a flow diagram relating to another example operations that can be performed by a data processing device, in accordance with various aspects and embodiments of the subject disclosure.

In example embodiments, a data processing method can be performed by a data processing device (e.g., computer 120, mobile device 310, a device wherein the camera and the computer are integrated together, etc.) that comprises a microprocessor and a memory that stores executable instructions that, when executed by the microprocessor, facilitate performance of data processing operations (e.g., methods) as described in FIG. 5.

The operations 500 can comprise, at block 505, receiving a first set of camera data representative of a first pattern of coded light emitted from a light emitting device (e.g., light emitting device 110, which can be one or more light emitting diodes (LEDs)) of an equipment (e.g., equipment 105), wherein the first set of camera data is derived from first images captured by a camera sampling at a first frequency, and wherein the first images are captured using a field of view of the camera associated with the equipment comprising the light emitting device that emitted the first pattern of coded light.

The operations 500 can comprise, at block 510, determining from the first set of camera data a region of interest related to a location of the light emitting device of the equipment, wherein the region of interest is within the field of view and is narrower than the field of view At block 515, the operations 500 can comprise, facilitating transmitting a command to the camera to narrow the field of view to focus on the region of interest.

At block 520, the operations 500 can comprise, receiving a second set of camera data based on second images captured by the camera, wherein the second images capture a second pattern of coded light transmitted at a second frequency.

At block 525, the operations 500 can comprise, processing the second set of camera data.

The operations 500 can comprise, at block 530, based on the processing of the second set of camera data, determining equipment data related to the equipment (various of examples of equipment data were described above). Determining the equipment data can comprise comparing the difference between one of the images of the first images and another of the images of the first images, and for example, decoding the information.

The operations 500 can further comprise, facilitating outputting information related to the equipment data.

In example embodiments, an apparatus is provided. The apparatus (e.g., equipment 105) can comprise a light emitting device (e.g., a light emitting diode (LED, one or more LEDs), a sensor, a microprocessor and a memory that stores executable instructions that, when executed by the microprocessor, facilitate performance of operations (e.g., methods) as described in FIG. 6.

Figure 6:
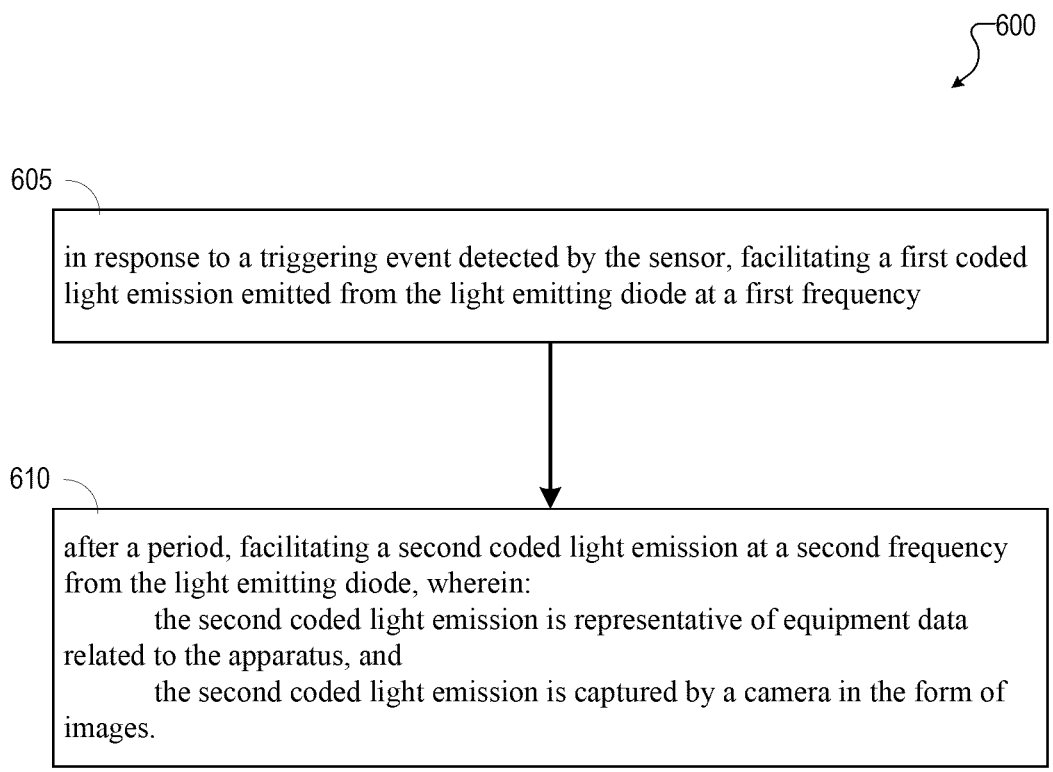
FIG. 6 illustrates a flow diagram relating to example operations that can be performed by an equipment comprising a light emitting device, in accordance with various aspects and embodiments of the subject disclosure.

Referring to FIG. 6, the operations 600 can comprise, at block 605, in response to a triggering event detected by the sensor, facilitating a first coded light emission emitted from the light emitting device at a first frequency.

At block 610, the operations 600 can comprise, after a period, facilitating a second coded light emission at a second frequency from the light emitting device, wherein the second coded light emission is representative of equipment data related to the apparatus, and wherein the second coded light emission is captured by a camera in the form of images. A variety of sensors can be employed by the apparatus, including for example, a light sensor, wherein the triggering event comprises a light emission (e.g., emitted from mobile device 305). The sensor can comprise an RFID receiver, wherein the triggering event comprises an RFID signal. The sensor can comprise an audio sensor (e.g., a microphone), and wherein the triggering event can comprise a sound, or an audible signal.

Figure 7:
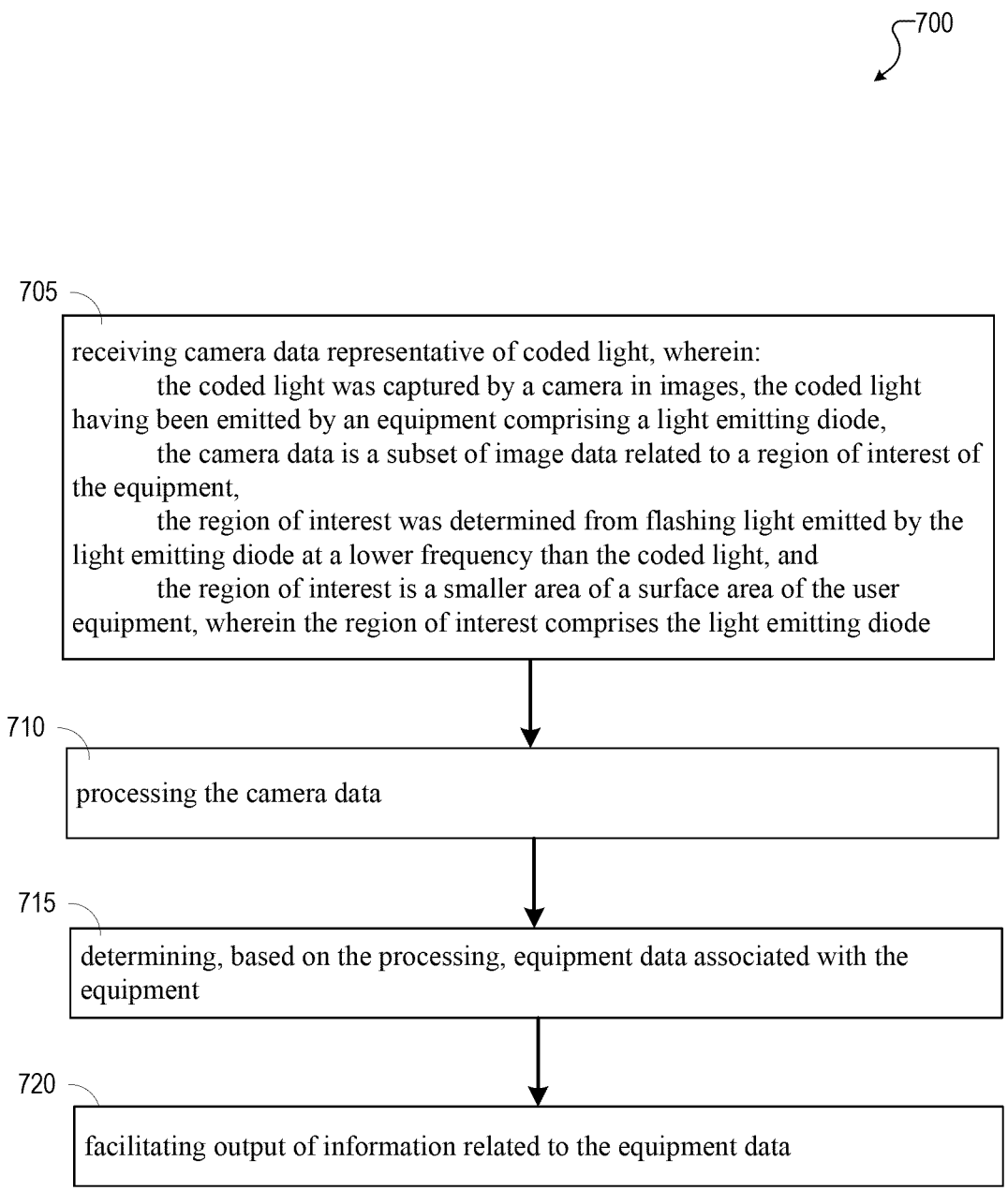
FIG. 7 illustrates a flow diagram relating to another example of operations that can be performed by a data processing device, in accordance with various aspects and embodiments of the subject disclosure.

In example embodiments, a data processing method can be performed by a data processing device (e.g., computer 120, mobile device 310, a device wherein the camera and the computer are integrated together, etc.) that comprises a microprocessor and a memory that stores executable instructions that, when executed by the microprocessor, facilitate performance of data processing operations (e.g., methods) as described in FIG. 7.

The operations 700 can comprise, at block 705 receiving camera data representative of coded light, wherein the coded light was captured by a camera in images, the coded light having been emitted by an equipment comprising a light emitting diode, wherein the camera data is a subset of image data related to a region of interest of the equipment, wherein the region of interest was determined from flashing light emitted by the light emitting diode at a lower frequency than the coded light, and wherein the region of interest is a smaller area of a surface area of the user equipment, wherein the region of interest comprises the light emitting diode (705). The camera data can be received, for example, from a mobile device comprising a camera, a stand-alone camera device, which can also have a microprocessor and memory.

The operations 700 can further comprise, at block 710, processing the camera data (710).

Figure 2:
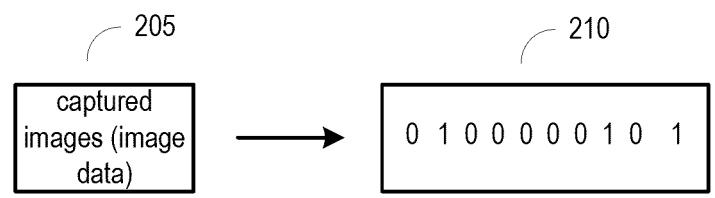
FIG. 2 is a visual illustrating the translation of image data to a signal format, in accordance with various aspects and embodiments of the subject disclosure.

The operations 700 can further comprise, at block 715, determining, based on the processing, equipment data associated with the equipment. Examples of equipment data were mentioned above. FIG. 2 also describes some of the coded forms in which the equipment data can take.

The operations 700 can further comprise, at block 720, facilitating output of information related to the equipment data (720). The information, as mentioned above, can be a display on a screen (e.g., display on the device of the equipment), a transmission of a text message or an email, the like.

Figure 8:
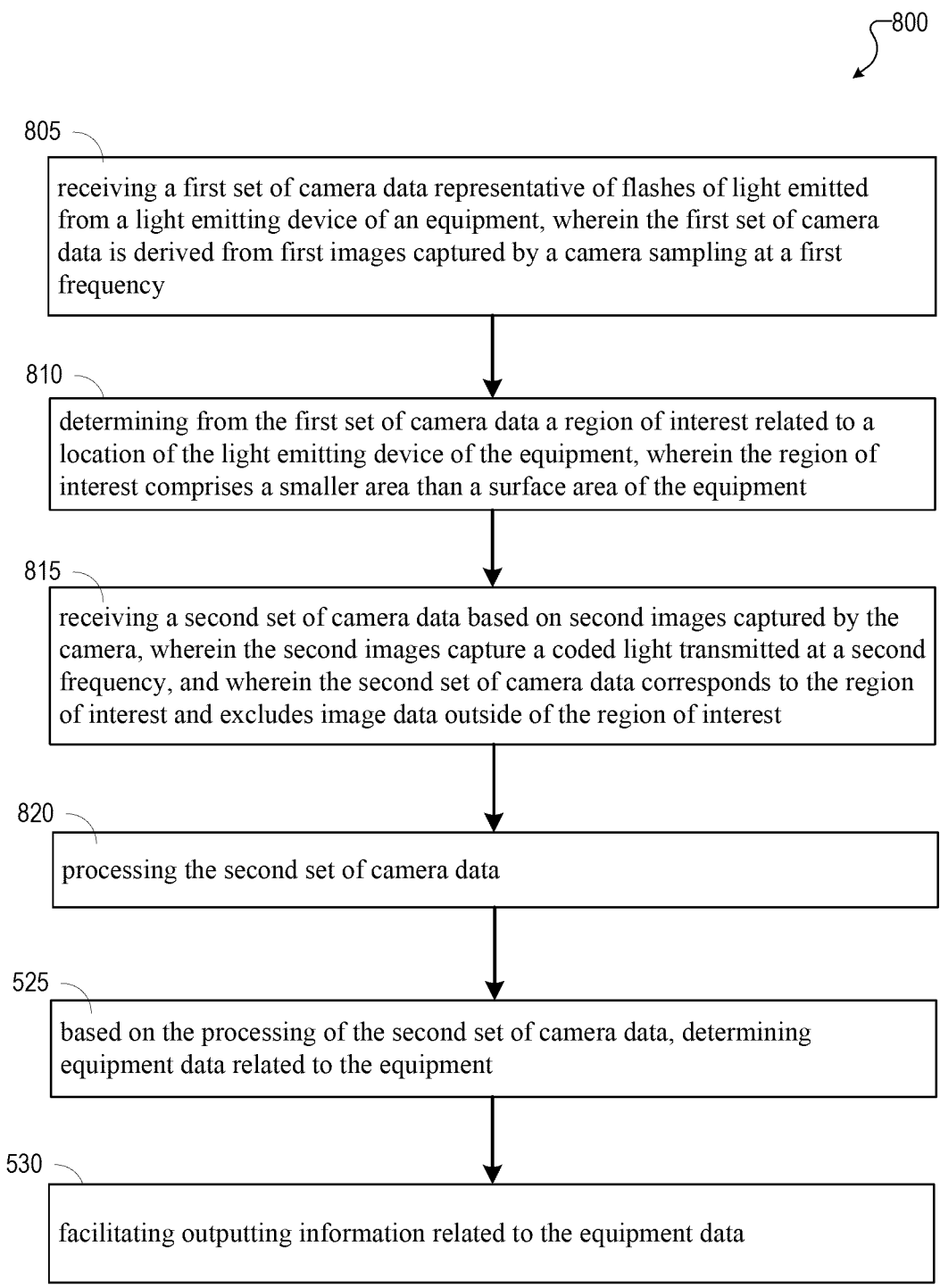
FIG. 8 illustrates a flow diagram relating to another example operations that can be performed by a data processing device, in accordance with various aspects and embodiments of the subject disclosure.

In example embodiments, a data processing method can be performed by a data processing device (e.g., computer 120, mobile device 310, a device wherein the camera and the computer are integrated together, etc.) that comprises a microprocessor and a memory that stores executable instructions that, when executed by the microprocessor, facilitate performance of data processing operations (e.g., methods) as described in FIG. 8.

The operations 800 can comprise, at block 805, receiving a first set of camera data representative of flashes of light emitted from a light emitting device of an equipment, wherein the first set of camera data is derived from first images captured by a camera sampling at a first frequency (805).

At block 810, the operations can comprise determining from the first set of camera data a region of interest related to a location of the light emitting device of the equipment, wherein the region of interest comprises a smaller area than a surface area of the equipment.

The operations can, at block 815, comprise receiving a second set of camera data based on second images captured by the camera, wherein the second images capture a coded light transmitted at a second frequency, and wherein the second set of camera data corresponds to the region of interest and excludes image data outside of the region of interest.

The operations can, at block 820, comprise processing the second set of camera data.

At block 825, the operations 800 can comprise, based on the processing of the second set of camera data, determining equipment data related to the equipment (825). As mentioned above with respect to FIG. 2, the coded light can be used to communicate data, and examples of equipment data are also described above.

At block 830, the operations 800 can comprise facilitating outputting information related to the equipment data (830). As mentioned above, this information can be displayed on a screen, transmitted via an email or text, etc.

Figure 9:
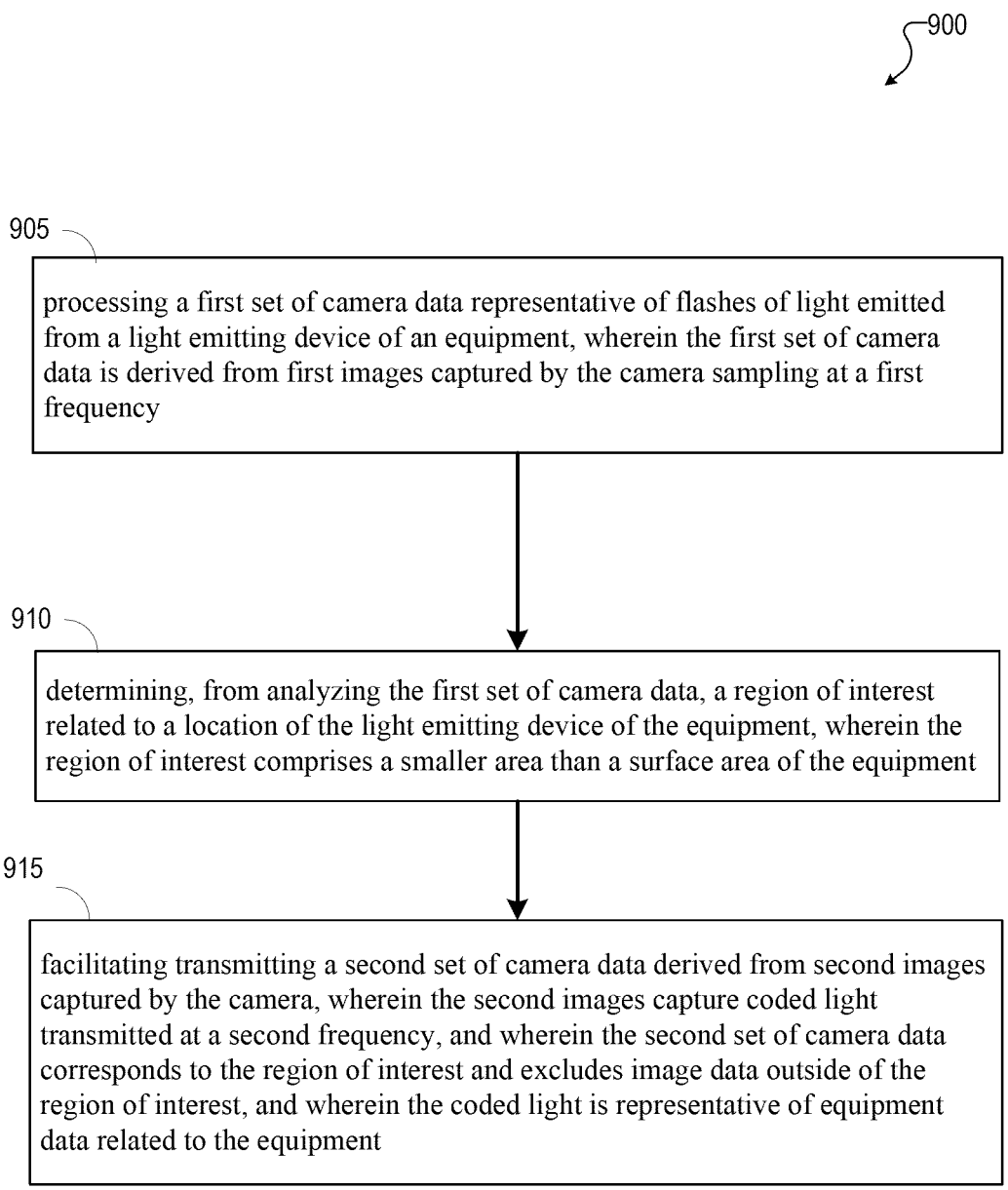
FIG. 9 illustrates a flow diagram relating to another example operations that can be performed by a data processing device comprising a camera, in accordance with various aspects and embodiments of the subject disclosure.

In example embodiments, a data processing method can be performed by a device that comprises a microprocessor, a camera, and a memory (e.g., device having a camera, camera 115, mobile device 310) that stores executable instructions that, when executed by the microprocessor, facilitate performance of data processing operations (e.g., methods) as described in FIG. 9.

The operations 900 can comprise, at 905, processing a first set of camera data representative of flashes of light emitted from a light emitting device of an equipment, wherein the first set of camera data is derived from first images captured by the camera sampling at a first frequency.

At 910, the operations 900 can comprise determining, from analyzing the first set of camera data, a region of interest related to a location of the light emitting device of the equipment, wherein the region of interest comprises a smaller area than a surface area of the equipment.

The operations 900 can comprise, at 915, facilitating transmitting a second set of camera data derived from second images captured by the camera, wherein the second images capture coded light transmitted at a second frequency, and wherein the second set of camera data corresponds to the region of interest and excludes image data outside of the region of interest, and wherein the coded light is representative of equipment data related to the equipment, examples of which were described above with respect to FIG. 2.

Figure 10:
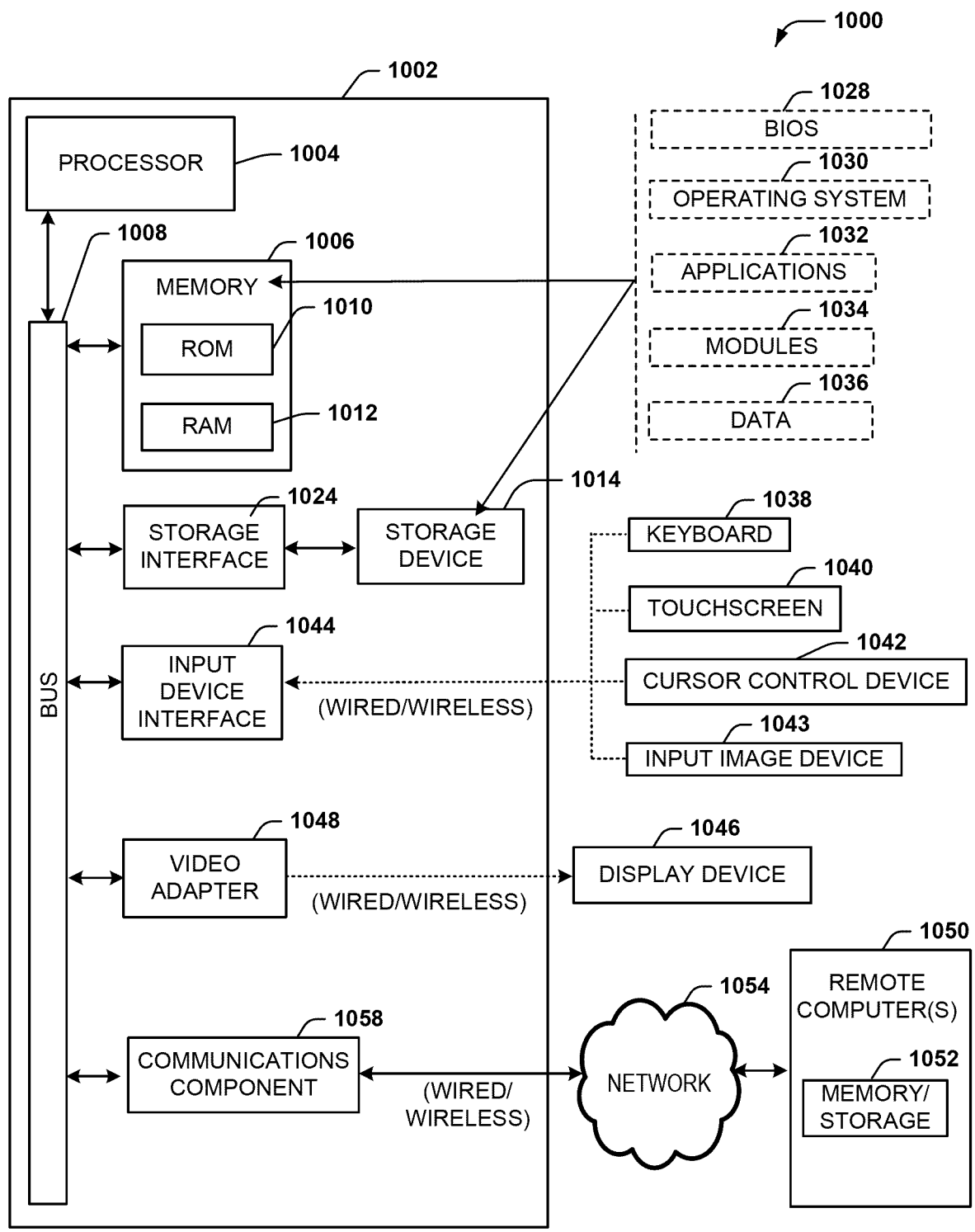
FIG. 10 illustrates an example block diagram of a computer that can be operable to execute processes and methods in accordance with various aspects and embodiments of the subject disclosure.

FIG. 10 schematically shows an example implementation of a computing system 1000. In example implementations, various devices used in the systems described above (e.g., the data processing devices claimed below, computer 120, camera 115, equipment 105, mobile device 305), in accordance with this disclosure, can comprise one or more components as described in FIG. 10. The computing system 1000 can include a computer 1002. The local device 105, can be an edge computing device. Computer 1002 can comprise a microprocessor 1004, memory 1006, various interfaces, and various adapters, each of which can be coupled via a local interface, such as system bus 1008. The system bus 1008 can be any of several types of bus structures that can interconnect to a memory bus (with or without a memory controller), a peripheral bus, and a local bus using any of a variety of commercially available bus architectures.

The microprocessor 1004 is capable of processing computer-executable instructions that, when executed by the microprocessor 1004, facilitate performance of operations, including methods, operations, functions, or steps described in this disclosure. The microprocessor 1004 can comprise one of more devices that can process the instructions. The computer-executable instructions can comprise a program file, software, software module, program module, software application, etc., that is in a form that can ultimately be run by the microprocessor 1004. The computer-executable instructions can be, for example: a compiled program that can be translated into machine code in a format that can be loaded into a random access memory 1012 of memory 1006 and run by the microprocessor 1004; source code that may be expressed in proper format such as object code that is capable of being loaded into a random access memory 1012 and executed by the microprocessor 1004; or source code that may be interpreted by another executable program to generate instructions in a random access memory 1012 to be executed by the microprocessor 1004, etc. Although the software applications as described herein may be embodied in software or code executed by hardware as discussed in FIG. 10, as an alternative the same may also be embodied in dedicated hardware or a combination of software/general purpose hardware and dedicated hardware.

The computer-executable instructions can be stored on a machine-readable storage media (i.e., computer-readable storage media, also referred to as machine-readable storage medium, or as computer-readable storage medium). The computer-readable storage media can comprise memory 1006, as well as storage device 1014. The memory 1006 can represent multiple memories that operate in parallel processing circuits, and memory 1006 can comprise both nonvolatile memory (e.g., read-only memory (ROM)) and volatile memory (e.g., random access memory (RAM)), illustrated by way of example as ROM 1010 and RAM 1012.

The computer 1002 can further comprise a storage device 1014 (or additional storage devices) that can store data or software program modules. Storage device 1014 can comprise, for example, an internal hard disk drive (HDD) (e.g., EIDE, SATA), solid state drive (SSD), one or more external storage devices (e.g., a magnetic floppy disk drive (FDD), a memory stick or flash drive reader, a memory card reader, etc.), an optical disk drive 1020 (e.g., which can read or write from a compact disc (CD), a digital versatile disk (DVD), a BluRay Disc (BD), etc.). While storage device 1014 is illustrated as located within the computer 1002, the storage device 1014 can also be of the variety configured for external, or peripheral, location and use (e.g., external to the housing of the computer 1002). The storage device can be connected to the system bus 1008 by storage interface 1024, which can be an HDD interface, an external storage interface, an optical drive interface, a Universal Serial Bus (USB) interface, and any other internal or external drive interfaces.

ROM 1010, and also storage device 1014, can provide nonvolatile storage of data, data structures, databases, software program modules (e.g., computer-executable instructions), etc., which can be, for example, a basic input/output system (BIOS) 1028, an operating system 1030, one or more application programs 1032, other program modules 1034, and application program data 1036. Where any component discussed herein is implemented in the form of software, any one of a number of programming languages can be employed, such as, for example, C, C++, C#, Objective C, Java®, JavaScript®, Perl, PHP, Visual Basic®, Python®, Ruby, Flash®, or other programming languages. Data can be stored in a suitable digital format. All or portions of the operating system, applications, modules, or data can also be cached in the RAM 1012. The microprocessor 1004 can also comprise on-chip memory to facilitate processing of the instructions. The systems and methods described herein can be implemented utilizing various commercially available operating systems or combinations of operating systems. Although the description of computer-readable storage media above refers to respective types of storage devices, it should be appreciated by those skilled in the art that other types of storage media which are readable by a computer, whether presently existing or developed in the future, could also be used in the example operating environment.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

To the extent that certain user inputs are desirable (as indicated by the dotted line), a user can enter commands and information into the computer 1002 using one or more wired/wireless input devices, such as a keyboard 1038, a touch screen 1040, or a cursor control device 1042 (such as a mouse, touchpad, or trackball), or an image input device (e.g., camera(s)) 1043. Other input devices (not shown) can comprise a microphone, an infrared (IR) remote control, a radio frequency (RF) remote control, or other remote control, a joystick, control pad, a virtual reality controller and/or virtual reality headset, a game pad, a stylus pen, a gesture sensor input device, a vision movement sensor input device, an emotion or facial detection device, a biometric input device, (e.g., fingerprint or iris scanner), or the like. These and other input devices are often connected to the processing unit 1004 through an input device interface 1044 that can be coupled to the system bus 1008, but can be connected by other interfaces, such as a parallel port, a game port, a USB port, audio port, an IR interface, a BLUETOOTH® interface, etc.

To the extent desired (as noted by the dotted line), a display device 1046, such as a monitor, television, or other type of display device, can be also connected to the system bus 1008 via an interface, such as a video adapter 1048. In addition to the display device 1046, a computer 1002 can also connect with other output devices (not shown), such as speakers, printers, etc.

The computer 1002 can operate in a networked environment using wired or wireless communications to one or more remote computers, such as a remote computer 1050 (e.g., one or more remote computers). The remote computer 1050 can be a workstation, a server computer, a router, a personal computer, a tablet, a cellular phone, a portable computer, microprocessor-based entertainment appliance, a peer device, a network node, and internet of things (IoT) device, and the like, and typically includes many or all of the elements described relative to the computer 1002, although, for purposes of brevity, only a memory/storage device 1052 is illustrated. When used in a networked environment, the computer 1002 can access cloud storage systems or other network-based storage systems in addition to, or in place of, external storage devices 1014 as described above. For example, as part of the cloud storage or network-based storage system, a remote computer 1050 can comprise a computing device that is primarily used for storage, such as a network attached storage device (NAS), redundant array of disks (RADs), or a device that is a part of a SAN (storage area network), wherein the storage device comprises memory/storage 1052. In a networked environment, program modules depicted relative to the computer 1002 or portions thereof, can be stored in the remote memory/storage device 1052 (some refer to this as "cloud storage" or "storage in the cloud). Likewise, data and information, including data associated with applications or program modules, can also be stored remotely at the remote memory/storage device 1052. A remote computer 1050 that is a server device can facilitate storage and retrieval of information to a networked memory/storage device 1052. Upon connecting the computer 1002 to an associated cloud storage system, the computer 1002 can manage storage provided by the cloud storage system as it would other types of external storage. For instance, access to cloud storage sources can be provided as if those sources were stored locally on the computer 1002.

Generally, a connection between the computer 1002 and a cloud storage system can be established, either via wired or wireless connectivity, over a network 1054. The network can be, for example, wireless fidelity (Wi-Fi) network, a local area network (LAN), wireless LAN, larger networks (e.g., a wide area network (WAN)), cable-based communication network (e.g., a communication network implementing the data over cable service interface specification (DOCSIS), asynchronous transfer mode (ATM) network, digital subscriber line (DSL) network, asymmetric digital subscriber line (ADSL) network, a cellular network (e.g., 4G Long Term Evolution (LTE), 5G, etc.), and other typical fixed and mobile broadband communications networks, and can comprise components (e.g., headend equipment, local serving office equipment, Digital Subscriber Line Access Multiplexers (DSLAMs), Cable Modem Termination Systems (CMTSs), cellular nodes, etc.) related to each of these types of networks. The network 1054 can facilitate connections to a global communications network (e.g., the Internet).

When used in a networking environment, the computer 1002 can be connected to the network 1054 through a wired or wireless communications component 1058. The communications component 1058 can comprise, for example, a network work interface adapter (e.g., network interface card), wireless access point (WAP) adapter. The communications component 1058 can also comprise cellular receivers, cellular transmitters, and cellular transceivers that enable cellular communications. The communications component 1058 can facilitate wired or wireless communication to the network 1054, which can include facilitating communications through a gateway device, such as a cable modem, DSL modem, ADSL modem, cable telephony modem, wireless router, or other devices that can be used to facilitate establishment of communications. The gateway device, which can be internal or external and a wired or wireless device, can be connected to the system bus 1008 via the communications component 1058. It will be appreciated that the network connections and components shown are examples, and other methods of establishing a communications link between a remote computer 1050 can be used.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a microprocessor, a microprocessor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a microprocessor, wherein the microprocessor can be internal or external to the apparatus and executes at least a part of the software or firmware application. As yet another example, a component can be an apparatus that provides specific functionality through electronic components without mechanical parts, the electronic components can comprise a microprocessor therein to execute software or firmware that confers at least in part the functionality of the electronic components. An interface can comprise input/output (I/O) components as well as associated microprocessor, application, and/or API components.

As it is used in the subject specification, the term "microprocessor" can refer to substantially any computing processing unit or device comprising single-core microprocessors; single-microprocessors with software multithread execution capability; multi-core microprocessors; multi-core microprocessors with software multithread execution capability; multi-core microprocessors with hardware multithread technology; parallel platforms; and parallel platforms with distributed shared memory. Additionally, a microprocessor can refer to an integrated circuit, a central processing unit (CPU), an application specific integrated circuit (ASIC), a digital signal microprocessor (DSP), a field programmable gate array (FPGA), a programmable logic controller (PLC), a complex programmable logic device (CPLD), a discrete gate or transistor logic, discrete hardware components, or any combination thereof designed to perform the functions described herein. Microprocessors can exploit nano-scale architectures such as, but not limited to, molecular and quantum-dot based transistors, switches and gates, in order to optimize space usage or enhance performance of UE. A microprocessor also can be implemented as a combination of computing processing units.

Furthermore, the disclosed subject matter can be implemented as a method, apparatus, or article of manufacture using standard programming and/or engineering techniques to produce software, firmware, hardware, or any combination thereof to control a computer to implement the disclosed subject matter.

The term "article of manufacture" as used herein is intended to encompass any computer-readable device, computer-readable carrier, or computer-readable storage media having stored thereon computer-executable instructions. Computing devices typically comprise a variety of media, which can comprise computer-readable storage media, which can be implemented in connection with any method or technology for storage of information such as computer-readable instructions, program modules, structured data, or unstructured data. Computer-readable storage media can be any available storage media that can be accessed by the computer, and can comprise various forms of memory, as will be elaborated further below.

In the subject specification, terms such as "store," "data store," "data storage," "database," "repository," "queue", and substantially any other information storage component relevant to operation and functionality of a component, refer to "memory components," or entities embodied in a "memory" or components comprising the memory. Memory can be of various types, such as hard-disk drives (HDD), floppy disks, zip disks, magnetic cassettes, magnetic tape, magnetic disk storage or other magnetic storage devices, flash memory devices (cards, sticks, key drives, thumb drives), cartridges, optical discs (e.g., compact discs (CD), digital versatile disk (DVD), Blu-ray Disc (BD)), a virtual device that emulates a storage device, and other tangible and/or non-transitory media which can be used to store desired information. It will be appreciated that the memory components or memory elements described herein can be removable or stationary. Moreover, memory can be internal or external to a device or component. Memory can also comprise volatile memory as well as nonvolatile memory, whereby volatile memory components are those that do not retain data values upon loss of power and nonvolatile components are those that retain data upon a loss of power.

By way of illustration, and not limitation, nonvolatile memory can comprise read only memory (ROM), programmable ROM (PROM), erasable programmable ROM (EPROM), electrically erasable programmable ROM (EEPROM), or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), magnetic random access memory (MRAM), and direct Rambus RAM (DRRAM). Additionally, the disclosed memory components of systems or methods herein are intended to comprise these and any other suitable types of memory.

The term "facilitate" as used herein is in the context of a system, device or component "facilitating" one or more actions, methods, or example operations, in respect of the nature of complex computing environments in which multiple components and/or multiple devices can be involved in some computing operations. Non-limiting examples of actions that may or may not involve multiple components and/or multiple devices comprise the methods described herein, including but not limited to transmitting or receiving data, establishing a connection between devices, determining intermediate results toward obtaining a result, etc. In this regard, a computing device or component can facilitate an operation by playing any part in accomplishing the operation (e.g., directing, controlling, enabling, etc.). When operations of a component are described herein, it is thus to be understood that where the operations are described as facilitated by the component, the operations can be optionally completed with the cooperation of one or more other computing devices or components, such as, but not limited to, microprocessors, application specific integrated circuits (ASICs), sensors, antennae, audio and/or visual output devices, other devices, etc.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable storage media comprising computer-executable instructions for performing the acts or events of the various methods. Additionally, unless claim language specifically recites "means for", the claim is intended to encompass a recited claim structure, and not invoke means plus function language.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeably in the present application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Wherever the phrases "for example," "such as," "including" and the like are used herein, the phrase "and without limitation" is understood to follow unless explicitly stated otherwise.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Furthermore, references to singular components or items are intended, unless otherwise specified, to encompass two or more such components or items. For example, the articles "a" and "an" as used in this application and the appended claims should generally be construed to mean "one or more" unless specified otherwise or clear from context to be directed to a singular form.

The term "about" is meant to account for variations due to experimental error. All measurements or numbers are implicitly understood to be modified by the word about, even if the measurement or number is not explicitly modified by the word about.

The term "substantially" (or alternatively "effectively") is meant to permit deviations from the descriptive term that do not negatively impact the intended purpose. Descriptive terms are implicitly understood to be modified by the word substantially, even if the term is not explicitly modified by the word "substantially."

In addition, while a particular feature may have been disclosed with respect to only one of several implementations, such feature can be combined with one or more other features of the other implementations as may be desired and advantageous for any given or particular application. To the extent that the terms "has," "have", "having", "comprising" and "including" and "involving" and variants thereof (e.g., "comprises," "includes," and "involves") are used interchangeably and mean the same thing—these terms are defined consistent with the common patent law definition of "comprising" and is therefore interpreted to be an open term meaning "at least the following but is not limited to," and as such is not to be interpreted to exclude additional features, limitations, aspects, etc.

The above descriptions of various example embodiments and example implementations of the subject disclosure, corresponding figures, and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods or operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component (s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure. As such, although a particular feature of the present invention may have been illustrated or described with respect to only one of several implementations, any such feature may be combined with one or more other features of the other implementations as may be desired and advantageous for any given or particular application.

Therefore, the disclosed subject matter should not be limited to any single embodiment described herein, but rather should be construed in breadth and scope in accordance with the claims, including all equivalents, that are listed below.

The invention claimed is:

1. A data processing device, comprising:
a microprocessor; and
a memory that stores executable instructions that, when executed by the microprocessor, perform the operations, comprising:
receiving camera data representative of coded light, wherein:
the coded light was captured by a camera in images, the coded light having been emitted by an equipment comprising a light emitting diode,
the camera data is a subset of image data related to a region of interest of the equipment,
the region of interest was determined from flashing light emitted by the light emitting diode at a lower frequency than the coded light, and
the region of interest is a smaller area of a surface area of the user equipment, wherein the region of interest comprises the light emitting diode;
processing the camera data;
determining, based on the processing, equipment data associated with the equipment; and
facilitating outputting of information related to the equipment data.

2. The data processing device of claim 1, wherein the equipment data comprises a version of software installed in the equipment.

3. The data processing device of claim 1, wherein the equipment data comprises a status of the equipment.

4. The data processing device of claim 1, wherein the equipment data indicates that a component of the equipment is not functioning properly.

5. The data processing device of claim 1, wherein the equipment data indicates a setting of the equipment.

6. A data processing method performed by a microprocessor, the method comprising:
receiving a first set of camera data representative of flashes of light emitted from a light emitting device of an equipment, wherein the first set of camera data is derived from first images captured by a camera sampling at a first frequency;
determining from the first set of camera data a region of interest related to a location of the light emitting device of the equipment, wherein the region of interest comprises a smaller area than a surface area of the equipment;
receiving a second set of camera data based on second images captured by the camera, wherein the second images capture a coded light transmitted at a second frequency, and wherein the second set of camera data corresponds to the region of interest and excludes image data outside of the region of interest;
processing the second set of camera data;
based on the processing of the second set of camera data, determining equipment data related to the equipment; and
facilitating outputting information related to the equipment data.

7. The data processing method of claim 6, wherein the equipment data comprises a manufacturing date.

8. The data processing method of claim 6, wherein the equipment data comprises a version of software installed in the equipment.

9. The data processing method of claim 6, wherein the equipment data comprises hardware information related to the hardware components of the equipment.

10. The data processing method of claim 6, wherein the equipment data comprises diagnostic information.

11. The data processing method of claim 6, wherein the equipment data indicates a setting of the equipment.

12. A device comprising:
a microprocessor;
and
a memory that stores executable instructions that, when executed by the microprocessor, perform the operations, comprising:
processing a first set of camera data representative of flashes of light emitted from a light emitting device of an equipment, wherein the first set of camera data is derived from first images captured by a camera sampling at a first frequency;

determining, from analyzing the first set of camera data, a region of interest related to a location of the light emitting device of the equipment, wherein the region of interest comprises a smaller area than a surface area of the equipment;

facilitating transmitting a second set of camera data derived from second images captured by the camera, wherein the second images capture coded light transmitted at a second frequency, and wherein the second set of camera data corresponds to the region of interest and excludes image data outside of the region of interest, and wherein the coded light is representative of equipment data related to the equipment.

13. The device of claim 12, wherein the equipment data comprises a version of software installed in the equipment.

14. The data processing method of claim 12, wherein the equipment data comprises hardware information.

15. The data processing method of claim 12, wherein the equipment data comprises diagnostic information.

\* \* \* \* \*